May 22, 1956 C. F. SPROSTY 2,747,024

MAGNETIC ERASE HEADS

Filed Oct. 4, 1954

INVENTOR.
CLARENCE F. SPROSTY

BY Max L. Wymore

AGENT 2,747,024

MAGNETIC ERASE HEADS

Clarence F. Sprosty, Cleveland, Ohio, assignor to Clevite Corporation, Cleveland, Ohio, a corporation of Ohio Application October 4, 1954, Serial No. 460,049

10 Claims. (Cl. 179—100.2)

This invention relates to the art of magnetic recording and more particularly to an erase head for erasing a magnetic recording.

In magnetic recording a magnetic recording medium is magnetized in varying degrees along its length. The recording takes the form of variations in the remanent magnetization of the magnetic recording medium that are proportional to the instantaneous value of the signal being recorded. It is desirable to be able to remove or erase this recorded signal at will so that the medium may be used again for making other recordings.

One way this is usually accomplished consists in passing the recorded medium through a decaying alternating field in which the initial values of the field are great enough to saturate the medium completely and in which subsequent reversals of the field gradually decrease to zero leaving the recording medium demagnetized. Another way comprises saturating the recording medium with a supersonic frequency signal of sufficient amplitude to mask the previously recorded signals.

In order to meet the requirements set forth above it is usually necessary to use a supersonic frequency for energizing an erasing head of a practical size. This leads to difficulties since the losses in ferromagnetic cores at these frequencies are high and the current requirements to produce erasing fields of sufficient intensity may result in overheating the erase head. Conversely if the current is limited to avoid overheating, the erase head fails to erase or saturate the record completely.

It is a primary object of this invention to provide an erase head of simple construction which will provide a more effective demagnetization of even a difficult recording medium, having high coercive force, than erase heads used heretofore.

A further object is to provide an erase head having increased erase efficiency while requiring less erase current.

Figure 1:
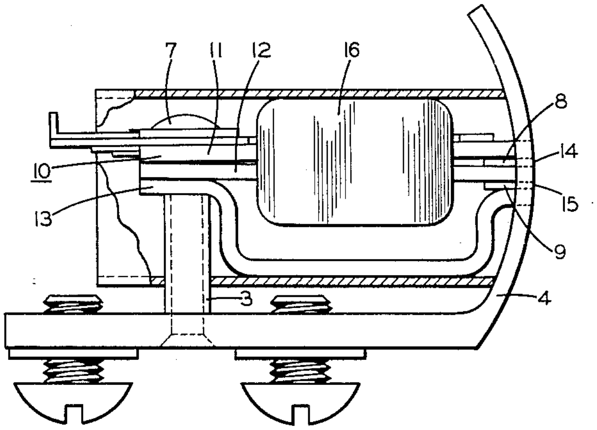
Figs. 1 and 2 are respectively a top view partly in section and a side view of the assembled erase head of the invention.
Figure 2:
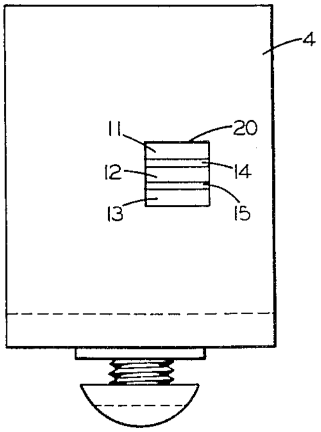
Figure 3:
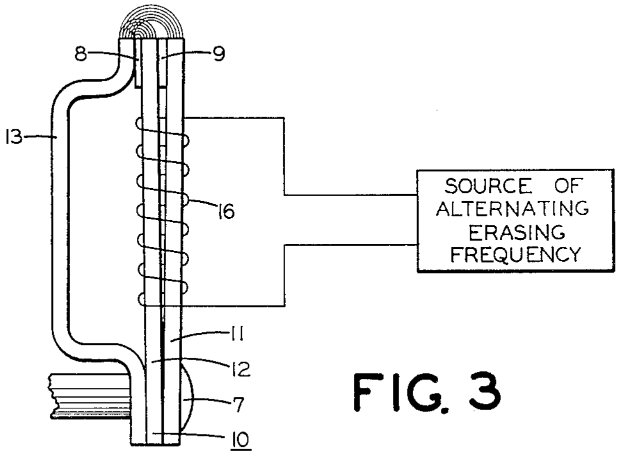
Figure 3 is a schematic of the erase head showing the magnetic paths and the magnetic fields present at the erase head gaps.
Figure 4:
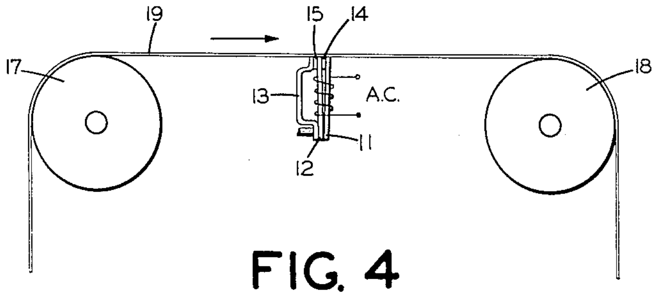
Figure 4 shows a system employing the erase magnet head.

Referring to the figures one form of the invention comprises a core 10 of a solid ferromagnetic material generally consisting of driven elements 11 and 12 and a return path element 13. The core elements 11, 12 and 13 are secured together in electrical contact at one end by means of rivet 7. At the opposite end the core elements are separated by means of non-magnetic spacers 8 and 9 to form erase gaps 14 and 15. Coil 16 surrounds core elements 11 and 12 and serves to energize the erase head when connected to a source of erase current (not shown) oscillating at a supersonic frequency. The individual core elements may be of laminated structure with even greater erase efficiency, however, the manufacturing cost is considerably greater than when solid cores are used. Reference will be had to a head with solid core elements which has proved more efficient than a conventional head using the more expensive laminated construction. The magnetic elements of the head may be positioned within a non-magnetic housing 4 by means of spacer 3 and secured by rivet 7 such that the pole pieces containing gaps 14 and 15 are positioned within window 17 of housing 4 to form a continuous surface therewith. The entire head can be shielded so that it will have little effect on nearby circuits.

When a recording medium 19 wound on reels 17 and 18 is drawn successively across gaps 15 and 14 and through the erasing fields existing at the gaps by any suitable means (not shown), the erasing fields act concurrently and sequentially on each element of the recording medium as it passes adjacent each gap, to erase any recorded signal therefrom. Core element 12 forms one magnetic path with core element 13 and core element 11 forms a second magnetic path with element 13. In operation a high intensity erase field is formed between 12 and 13 and an erase field of lesser intensity is formed between 11 and 13, thus each element of the recording medium is subjected concurrently and sequentially to alternating erase fields of diminishing intensity providing greater diffusion of the erase field than heretofore possible. While an erase head having two gaps is illustrated the use of two or more such gaps is contemplated.

The increased efficiency of a multiple sequential gap erase head according to this invention can best be illustrated by comparison with a prior art single gap erase head of the best laminated core structure in Table I.

TABLE I

*Erasure of a prerecorded 1000 C. P. S. signal*

| Head | Single Gap | Multiple Sequential Gap |
|---|---|---|
| Inductance | 7 mh. | 7–9 mh. |
| Erase freq | 60 kc. | 60 kc. |
| Erase current | 50 ma. | 38 ma. |
| Recorded signal level | 16 db above .001 Volt. | 16 db above .001 Volt. |
| Signal reduction expressed in db down from recorded signal level. | 43 db. | 51 db. |

A prerecorded magnetic tape in a single pass over the multiple sequential gap erase head of the invention with 38 ma. of erase current applied across the head gave 8 db or better increased erasure over a conventional single gap erase head with 50 ma. of erase current applied across the head. Erasures as high as 56 db down from a 16 db above .001 volt recorded 1000 C. P. S. signal have been obtained using 38 ma. of erase current applied across a multiple sequential gap head of the invention.

It may be noted that a relationship exists between the speed of the recording medium and the length of the erase gap which gives rise to increased erase efficiency at a particular frequency. This relationship is generally designated as $$\frac{\text{Speed}}{\text{Gap Length}}=\text{Frequency}$$

Since the multiple sequential gap head in effect has two overlapping gaps of different lengths, the result is a greater erase efficiency over a broader frequency range. This characteristic is found to be of material advantage when the erase head is used in multispeed recorders.

While a preferred embodiment of the invention has been disclosed it is intended that the invention not be limited thereto, but only by the spirit and scope of the appended claims.

I claim:

1. A magnetic erase head comprising three core segments spaced apart at one extremity to define two gaps and magnetically interconnected in spaced relation from said gaps, a coil for alternating erase current wound around and supported on two adjacent ones of said core segments so as to establish the same magnetic polarity at said one extremity of each of said two coil supporting segments.

2. A magnetic erase head as set forth in claim 1 wherein the gaps are serially disposed.

3. A magnetic erase head comprising a magnet core of at least two elongated magnetic core segments in magnetic contact at a first end and magnetically insulated at the opposite end by a non-magnetic spacer therebetween, an energizing coil for alternating erase current wound around said core segments so as to establish the same magnetic polarity at said opposite end of each core segment and a return path magnetic segment in magnetic contact with said first end and insulated from said opposite end by means of a non-magnetic spacer defining a magnetic gap of the same magnetic polarity between each of the magnetic core segments and the return path segment.

4. The erase head of claim 3 wherein the core segments and the non-magnetic spacers form a continuous surface.

5. A magnetic erase head comprising a magnetic core of at least two contiguous magnetic core segments separated at one end by a non-magnetic spacer defining in part a magnetic gap and being in magnetic contact at a point removed from said gap end, an energizing coil for alternating erase current wound around said core segments so as to establish the same magnetic polarity at said one end of each core segment and a return path magnetic segment in magnetic contact with said magnetic core segment at a point removed from said gap end and separated at the gap end from the magnetic core segments by means of a non-magnetic spacer defining a magnetic gap of the same polarity between each core segment and the return path segment.

6. In a magnetic recording and/or reproducing system, a magnetic recording medium, an erase head comprising a magnet core of at least two elongated magnetic core segments in magnetic contact at a first end and magnetically insulated at the opposite end by a non-magnetic spacer therebetween, an energizing coil for alternating erase current wound around said core segments so as to establish the same magnetic polarity at said opposite end of each core segment and a return path magnetic segment in magnetic contact with said first end of the magnetic core segments and insulated from the said opposite end by means of a non-magnetic spacer defining a magnetic gap of the same magnetic polarity between each of the magnetic core segments and the return path segment and means for moving said medium serially across the magnetic gaps in a direction remote from the return path segment to subject said medium successively to magnetic erase fields of the same polarity.

7. A magnetic erasing head comprising at least two adjacent elongated core segments in magnetic contact at a first end and spaced apart at the opposite end, a return path segment in magnetic contact with said first end of said core segments and spaced apart from said opposite end of said core segments to define a plurality of gaps of varying widths between each of said core segments and the return path segment and a coil wound around said core segments so as to establish a magnetic field between the return path segment and each of the adjacent core segments having the same phase.

8. A magnetic erasing head comprising a magnetic core of at least two adjacent elongated magnetic core segments in magnetic contact at a first end and magnetically insulated at the opposite end by a non-magnetic spacer therebetween, a return path magnetic segment in magnetic contact with said first end of the magnetic core segments and insulated from said opposite end by means of a non-magnetic spacer defining a magnetic gap between each of the magnetic core segments and the return path segment and a coil wound around said adjacent magnetic core segments so as to establish magnetic fields between each of the magnetic core segments and the return path segment of the same phase and of diminishing amplitude in a direction remote from the return path segment.

9. A magnetic erase head comprising three core segments spaced apart at one extremity to define two gaps and magnetically interconnected in spaced relation from said gaps, a coil for alternating erase current wound around two adjacent ones of said core segments for developing an erase field across each of said gaps having the same phase but differing in intensity.

10. In a magnetic recording and/or reproducing system, an erase head comprising three core segments spaced apart at one extremity to define two gaps and magnetically interconnected in spaced relation from said gaps, a coil for alternating erase current wound around and supported on two adjacent ones of said core segments so as to establish the same magnetic polarity at said one extremity of each of said two coil supporting segments, a magnetic recording medium, means for moving said medium serially and successively across said gaps in a direction so as to subject the medium to in-phase magnetic erase fields of diminishing intensity.

References Cited in the file of this patent

UNITED STATES PATENTS

| | | |
|---|---|---|
| 2,655,562 | Clark | Oct. 13, 1953 |
| 2,702,835 | Camras | Feb. 22, 1955 |